(12) United States Patent
Lazar et al.

(10) Patent No.: US 10,848,577 B2
(45) Date of Patent: Nov. 24, 2020

(54) COMPUTING ENVIRONMENT MODIFICATION BASED ON AN IMPACT CURVE

(71) Applicant: Microsoft Technology Licensing, LLC, Redmond, WA (US)

(72) Inventors: Filip Lazar, Seattle, WA (US); Richard T. Guy, Redmond, WA (US); Tong Xia, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 326 days.

(21) Appl. No.: 15/192,696

(22) Filed: Jun. 24, 2016

(65) Prior Publication Data

US 2017/0374165 A1 Dec. 28, 2017

(51) Int. Cl.
*H04L 29/08* (2006.01)

(52) U.S. Cl.
CPC .............. *H04L 67/22* (2013.01); *H04L 67/06* (2013.01); *H04L 67/16* (2013.01)

(58) Field of Classification Search
CPC .. G06F 11/34; G06F 11/3409; G06F 11/3495; G06F 11/3668; G06F 2201/815; G06F 9/455; H04L 67/22
See application file for complete search history.

(56) References Cited

U.S. PATENT DOCUMENTS 8,166,155 B1 * 4/2012 Rachmeler .......... G06F 11/3438 709/224
8,214,804 B2 7/2012 Robertson
8,234,632 B1 * 7/2012 Hugeback ........... G06F 11/3495 717/130
8,321,359 B2 * 11/2012 Buchs ................... G06F 16/957 706/19
8,510,651 B1 * 8/2013 Palkar .................. G06F 16/958 715/273

(Continued)

OTHER PUBLICATIONS

Elizabeth, Victoria, "A/B Testing to Cohort Analysis: A Growth Hacker Ecommerce Strategy", Published on: Sep. 16, 2013 Available at: https://www.ometria.com/blog/bid/333914/A-B-Testing-to-Cohort-Analysis-A-Growth-Hacker-Ecommerce-Strategy (cited in IDS).*

(Continued)

*Primary Examiner* — Jason D Recek
*Assistant Examiner* — Ranjan Pant
(74) *Attorney, Agent, or Firm* — International IP Law Group, PLLC (57) ABSTRACT

In one example, a method includes monitoring user interaction with a modified computing environment for a period of time and detecting a plurality of groups of users, each group of users corresponding to a different initial time of interaction with the modified computing environment. The method also includes generating a metric for each of the groups of users, the metric corresponding to an action in the modified computing environment initiated by the users in each group. Additionally, the method includes generating an impact curve corresponding to the modified computing environment based on aggregated metrics for each of the plurality of groups of users and disabling the modification to the computing environment in response to detecting values along the impact curve are below a threshold value.

18 Claims, 5 Drawing Sheets

(56) References Cited

U.S. PATENT DOCUMENTS

| | | | | |
|---|---|---|---|---|
| 8,868,439 | B2* | 10/2014 | Spektor | G06F 21/316 705/7.11 |
| 8,892,343 | B2* | 11/2014 | Gupta | G08G 1/0133 701/117 |
| 8,979,651 | B1* | 3/2015 | Lan | A63F 13/12 463/31 |
| 9,098,387 | B1* | 8/2015 | Curtis | A63F 13/798 |
| 9,454,765 | B1* | 9/2016 | Kane, Jr. | G06Q 30/0643 |
| 2009/0019372 | A1* | 1/2009 | Chu | G06F 16/954 715/748 |
| 2009/0183084 | A1* | 7/2009 | Robertson | G06Q 10/06 715/744 |
| 2009/0258700 | A1* | 10/2009 | Bright | A63F 13/10 463/31 |
| 2009/0281989 | A1* | 11/2009 | Shukla | G06F 16/972 |
| 2009/0282343 | A1* | 11/2009 | Catlin | G06Q 30/02 715/738 |
| 2010/0293016 | A1* | 11/2010 | Spektor | G06F 21/316 705/7.28 |
| 2014/0324532 | A1* | 10/2014 | Ghosh | G06Q 30/0202 705/7.31 |
| 2015/0095756 | A1* | 4/2015 | Aganovic | G06F 17/2247 715/234 |
| 2015/0227962 | A1* | 8/2015 | Wical | G06Q 30/0243 705/14.42 |
| 2016/0019464 | A1* | 1/2016 | Madhavan | G06F 16/972 706/11 |
| 2017/0300966 | A1* | 10/2017 | Dereszynski | G06Q 30/0254 |
| 2017/0364823 | A1* | 12/2017 | Ilic | H04L 51/24 |

OTHER PUBLICATIONS

Birkett, Alex, "Using Cohort Analysis for Conversion Optimization", Published on: Mar. 22, 2016 Available at: http://conversionxl.com/using-cohort-analysis-for-conversion-optimization/.

Hodges, Matt, "New in Intercom: A/B Testing, Increase Message Engagement", Published on: Oct. 16, 2015 Available at: https://blog.intercom.io/increase-message-engagement-conversion-ab-testing/.

"How filters, segments and tags work", Retrieved on: Apr. 12, 2016 Available at: https://docs.intercom.io/intercom-s-key-features-explained/how-filters-segments-and-tags-work#segments.

"Targeting Users in A/B Tests", Retrieved on: Apr. 12, 2016 Available at: http://docs.swrve.com/user-documentation/resource-ab-testing/targeting-users-in-ab-tests/.

Elizabeth, Victoria, "A/B Testing to Cohort Analysis: A Growth Hacker Ecommerce Strategy", Published on: Sep. 16, 2013 Available at https://www.ometria.com/blog/bid/333914/A-B-Testing-to-Cohort-Analysis-A-Growth-Hacker-Ecommerce-Strategy.

* cited by examiner

COMPUTING ENVIRONMENT MODIFICATION BASED ON AN IMPACT CURVE

BACKGROUND

As computing applications and services grow in complexity, user behavior can change as well. For example, modifications to applications and services can result in users seeking new products, increasing the use of an existing application or service, or otherwise modifying how the user interacts with an existing application or service. Accordingly, randomized experiment testing techniques, such as A/B testing, have been developed to determine a user's response to a modification to an application or service.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment described herein includes a system for testing a computing environment comprising a processor that can monitor user interaction with a modified computing environment for a period of time. The processor can also detect a plurality of groups of users, wherein each group of users corresponds to a different initial time of interaction with the modified computing environment. The processor can also generate a metric for each of the groups of users, the metric corresponding to an action in the modified computing environment initiated by the users in each group. Furthermore, the processor can generate an impact curve corresponding to the modified computing environment based on aggregated metrics for each of the plurality of groups of users and disable the modification to the computing environment in response to detecting values along the impact curve are below a threshold value.

Another embodiment described herein includes a method for testing a computing environment that includes monitoring, via a processor, user interaction with a modified computing environment for a period of time. The method can also include detecting, via the processor, a plurality of groups of users, wherein each group of users corresponds to a different initial time of interaction with the modified computing environment. Additionally, the method can include generating, via the processor, a metric for each of the groups of users, the metric corresponding to an action in the modified computing environment initiated by the users in each group. Furthermore, the metric can include generating, via the processor, an impact curve corresponding to the modified computing environment based on aggregated metrics for each of the plurality of groups of users and disabling, via the processor, the modification to the computing environment in response to detecting values along the impact curve are below a threshold value.

In yet another embodiment described herein, one or more computer-readable storage devices for testing a computing environment can include a plurality of instructions that, based at least on execution by a processor, cause the processor to monitor user interaction with a modified computing environment for a period of time. The plurality of instructions can also cause the processor to detect a plurality of groups of users, wherein each group of users corresponds to a different initial time of interaction with the modified computing environment. Additionally, the plurality of instructions can cause the processor to generate a metric for each of the groups of users, the metric corresponding to an action in the modified computing environment initiated by the users in each group. Furthermore, the plurality of instructions can cause the processor to generate an impact curve corresponding to the modified computing environment based on aggregated metrics for each of the plurality of groups of users and disable the modification to the computing environment in response to detecting values along the impact curve are below a threshold value.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

In some examples, A/B testing techniques can determine a user's behavior in response to a modification to a computer program or service based on averages over a period of time. However, the A/B testing techniques cannot detect a change in user behavior based on different time periods during the duration of an experiment. For example, A/B testing techniques cannot detect changes in user behavior on a daily basis for an experiment that is conducted over a period of several weeks. Rather, A/B testing techniques detect an average number of changes in user behavior for all of the days during the duration of an experiment.

In embodiments described herein, a system can detect a modification to a computing environment. A computing environment, as referred to herein, can include any suitable application or service, among others. For example, a computing environment can include a locally executed computer application, a website, a service available from a distributed server network, and the like. A modification can include any change to the computing environment such as a change to the appearance of the computing environment, a change to the functionality of the computing environment, and the like. As one example, a modification to the computing environment may include changing information displayed on a website, or changing graphics on a website, among others.

In some examples, the system can monitor user interaction with a modified computing environment for a period of time. In some embodiments, the period of time can correspond to a time frame for testing a modified computing environment. The system can also detect a plurality of groups of users, wherein each group of users corresponds to a different initial time of interaction with the modified computing environment. For example, each group of users may begin interacting with the modified computing environment on a different date or a different time. Accordingly, the period of time each group of users interacts with the modified computing environment can vary.

In some embodiments, the system can generate a metric for each of the groups of users, wherein the metric corresponds to an action in the modified computing environment initiated by the users in each group. The system can also generate an impact curve corresponding to the modified computing environment based on aggregated metrics for each of the plurality of groups of users and disable the modification to the computing environment in response to detecting values along the impact curve are below a threshold value. For example, the system can determine that a modification to the computing environment reduces a number of actions by users within a period of time, and the original state of the computing environment can be restored.

Figure 1:
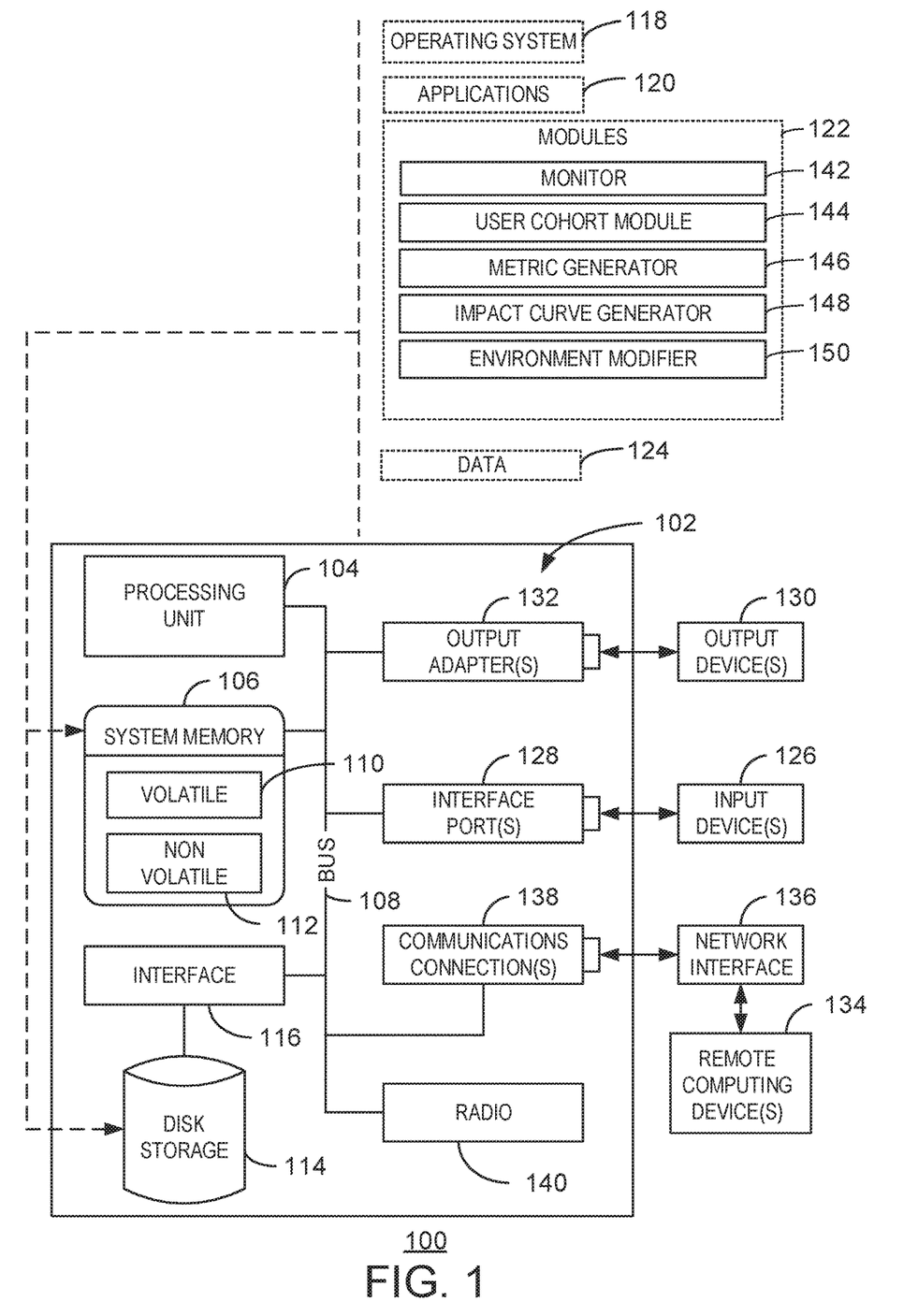
FIG. 1 is a block diagram of an example of a computing system that can test a computing environment.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1 discussed below, provide details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that can test a computing environment. The example system 100 includes a computing device 102. The computing device 102 includes a processing unit 104, a system memory 106, and a system bus 108. In some examples, the computing device 102 can be a gaming console, a personal computer (PC), an accessory console, a gaming controller, among other computing devices. In some examples, the computing device 102 can be a node in a cloud network.

The system bus 108 couples system components including, but not limited to, the system memory 106 to the processing unit 104. The processing unit 104 can be any of various available processors. Dual microprocessors and other multiprocessor architectures also can be employed as the processing unit 104.

The system bus 108 can be any of several types of bus structure, including the memory bus or memory controller, a peripheral bus or external bus, and a local bus using any variety of available bus architectures known to those of ordinary skill in the art. The system memory 106 includes computer-readable storage media that includes volatile memory 110 and nonvolatile memory 112.

The basic input/output system (BIOS), containing the basic routines to transfer information between elements within the computer 102, such as during start-up, is stored in nonvolatile memory 112. By way of illustration, and not limitation, nonvolatile memory 112 can include read-only memory (ROM), programmable ROM (PROM), electrically programmable ROM (EPROM), electrically erasable programmable ROM (EEPROM), or flash memory.

Volatile memory 110 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 102 also includes other computer-readable media, such as removable/non-removable, volatile/non-volatile computer storage media. FIG. 1 shows, for example a disk storage 114. Disk storage 114 includes, but is not limited to, devices like a magnetic disk drive, floppy disk drive, tape drive, Jaz drive, Zip drive, LS-210 drive, flash memory card, or memory stick.

In addition, disk storage 114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 114 to the system bus 108, a removable or non-removable interface is typically used such as interface 116.

It is to be appreciated that FIG. 1 describes software that acts as an intermediary between users and the basic computer resources described in the suitable operating environment 100. Such software includes an operating system 118. Operating system 118, which can be stored on disk storage 114, acts to control and allocate resources of the computer 102.

System applications 120 take advantage of the management of resources by operating system 118 through program modules 122 and program data 124 stored either in system memory 106 or on disk storage 114. It is to be appreciated that the disclosed subject matter can be implemented with various operating systems or combinations of operating systems.

A user enters commands or information into the computer 102 through input devices 126. Input devices 126 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 126 connect to the processing unit 104 through the system bus 108 via interface ports 128. Interface ports 128 include, for example, a serial port, a parallel port, a game port, and a universal serial bus (USB).

Output devices 130 use some of the same type of ports as input devices 126. Thus, for example, a USB port may be used to provide input to the computer 102 and to output information from computer 102 to an output device 130.

Output adapter 132 is provided to illustrate that there are some output devices 130 like monitors, speakers, and printers, among other output devices 130, which are accessible via adapters. The output adapters 132 include, by way of illustration and not limitation, video and sound cards that provide a means of connection between the output device 130 and the system bus 108. It can be noted that other devices and systems of devices provide both input and output capabilities such as remote computing devices 134.

The computer 102 can be a server hosting various software applications in a networked environment using logical connections to one or more remote computers, such as remote computing devices 134. The remote computing devices 134 may be client systems configured with web browsers, PC applications, mobile phone applications, and the like. The remote computing devices 134 can be a personal computer, a server, a router, a network PC, a workstation, a microprocessor based appliance, a mobile phone, a peer device or other common network node and the like, and typically includes many or all of the elements described relative to the computer 102.

Remote computing devices 134 can be logically connected to the computer 102 through a network interface 136 and then connected via a communication connection 138, which may be wireless. Network interface 136 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 138 refers to the hardware/software employed to connect the network interface 136 to the bus 108. While communication connection 138 is shown for illustrative clarity inside computer 102, it can also be external to the computer 102. The hardware/software for connection to the network interface 136 may include, for exemplary purposes, internal and external technologies such as, mobile phone switches, modems including regular telephone grade modems, cable modems and DSL modems, ISDN adapters, and Ethernet cards.

The computer 102 can further include a radio 140. For example, the radio 140 can be a wireless local area network radio that may operate one or more wireless bands. For example, the radio 140 can operate on the industrial, scientific, and medical (ISM) radio band at 2.4 GHz or 5 GHz. In some examples, the radio 140 can operate on any suitable radio band at any radio frequency.

The computer 102 includes one or more modules 122, such as a monitor 142, a user cohort module 144, a metric generator 146, an impact curve generator 148, and an environment modifier 150, configured to enable testing a computing environment. In some embodiments, the monitor 142 can monitor user interaction with a modified computing environment for a period of time. For example, the monitor can detect user input received by the modified computing environment. The user input can include selecting icons, entering text, uploading content, and the like. In some embodiments, the user cohort module 144 can detect a plurality of groups of users, wherein each group of users corresponds to a different initial time of interaction with the modified computing environment. For example, a modified computing environment may be monitored for a period of time, such as a month, and the user cohort module 144 may separate groups of users based on the day in which the users interacted with the modified computing for the first time. In other examples, the modified computing environment can be monitored for any suitable period of time and the groups of users can be separated based on any suitable time interval. For example, the user cohort module 144 can test or monitor a modified computing environment for a week based on seven groups of users corresponding to each day of the week.

In some embodiments, the metric generator 146 can generate a metric for each of the groups of users, wherein the metric corresponds to an action initiated by the users in each group. An action, as referred to herein, can include any suitable user input provided to the modified or unmodified portion of the computing environment. For example, the action can include uploading files or content, entering text, selecting icons, and the like. In some examples, the metric generator 146 can detect a difference between the actions performed by users interacting with a modified computing environment and actions performed by users interacting with an unmodified control computing environment. For example, the metric generator 146 can detect that users perform an action with a particular frequency in a modified computing environment versus users interacting with an unmodified controlled computing environment. Accordingly, the metric generator 146 can detect a change in the frequency of the actions performed by the users in the modified computing environment during an experiment. For example, the metric generator 146 can determine if users of the modified computing environment have a higher abandonment rate, select icons more frequently, use services more frequently, and the like. The metric generator 146 can provide metrics for users based on a time interval within an experiment. For example, the metric generator 146 can detect a rate of users that abandon or stop using a modified computing environment based on a time interval, such as any suitable number of hours or days, within an experiment that may last weeks or months.

In some embodiments, the impact curve generator 148 can generate an impact curve corresponding to the modified computing environment based on aggregated metrics for each of the plurality of groups of users. An impact curve, as referred to herein, can indicate a rate at which users perform an action in a period of time. For example, the impact curve can provide a visualization indicating whether users perform an action more frequently or less frequently during a period of time interacting with the modified computing environment. In some example, the impact curve generator 148 can generate the impact curve by aggregating or combining the metrics for each group of users, wherein the metrics correspond to time intervals within an experiment. In some embodiments, the environment modifier 150 can determine based on the impact curve that actions performed by the users decreases below a threshold value over time. The environment modifier 150 can return the computing environment to an original state prior to the modification in response to detecting a decrease in user actions. In some embodiments, the environment modifier 150 can detect that user actions increase over time and determine that the modification to the computing environment is to be made permanent.

It is to be understood that the block diagram of FIG. 1 is not intended to indicate that the computing system 102 is to include all of the components shown in FIG. 1. Rather, the computing system 102 can include fewer or additional components not illustrated in FIG. 1 (e.g., additional applications, additional modules, additional memory devices, additional network interfaces, etc.). Furthermore, any of the functionalities of the monitor 142, user cohort module 144, metric generator 146, impact curve generator 148, and environment modifier 150 may be partially, or entirely, implemented in hardware and/or in the processor 104. For example, the functionality may be implemented with an application specific integrated circuit, in logic implemented in the processor 104, or in any other device.

In some embodiments, the monitor 142, user cohort module 144, metric generator 146, impact curve generator 148, and environment modifier 150 can be arranged in a hierarchical manner. For example, the environment modifier 150 can modify a computing environment before a user can access the computing environment. In some embodiments, the monitor 142 can detect user interaction with the modified computing environment for a period of time. The user cohort module 144, metric generator 146, and impact curve generator 148 can then analyze and provide a visualization of the user interaction with the modified computing environment. In some embodiments, the computing system 102 is a server in a distributed network. Accordingly, the monitor 142, user cohort module 144, metric generator 146, impact curve generator 148, and environment modifier 150 are executed as part of a distributed service provided to remote computing devices 134. For example, the computing system 102 can detect a request by a remote computing device 134 to display a webpage. The computing system 102 can execute the environment modifier 150 to determine if any changes are to be made to a computing environment such as the webpage to be displayed. The monitor 142 can then detect user interaction with the modified computing environment in response to the computing system 102 sending the modified webpage to the remote computing device 134. For example, the monitor 142 can detect user interaction with the modified webpage from a user accessing the remote computing device 134.

Figure 2:
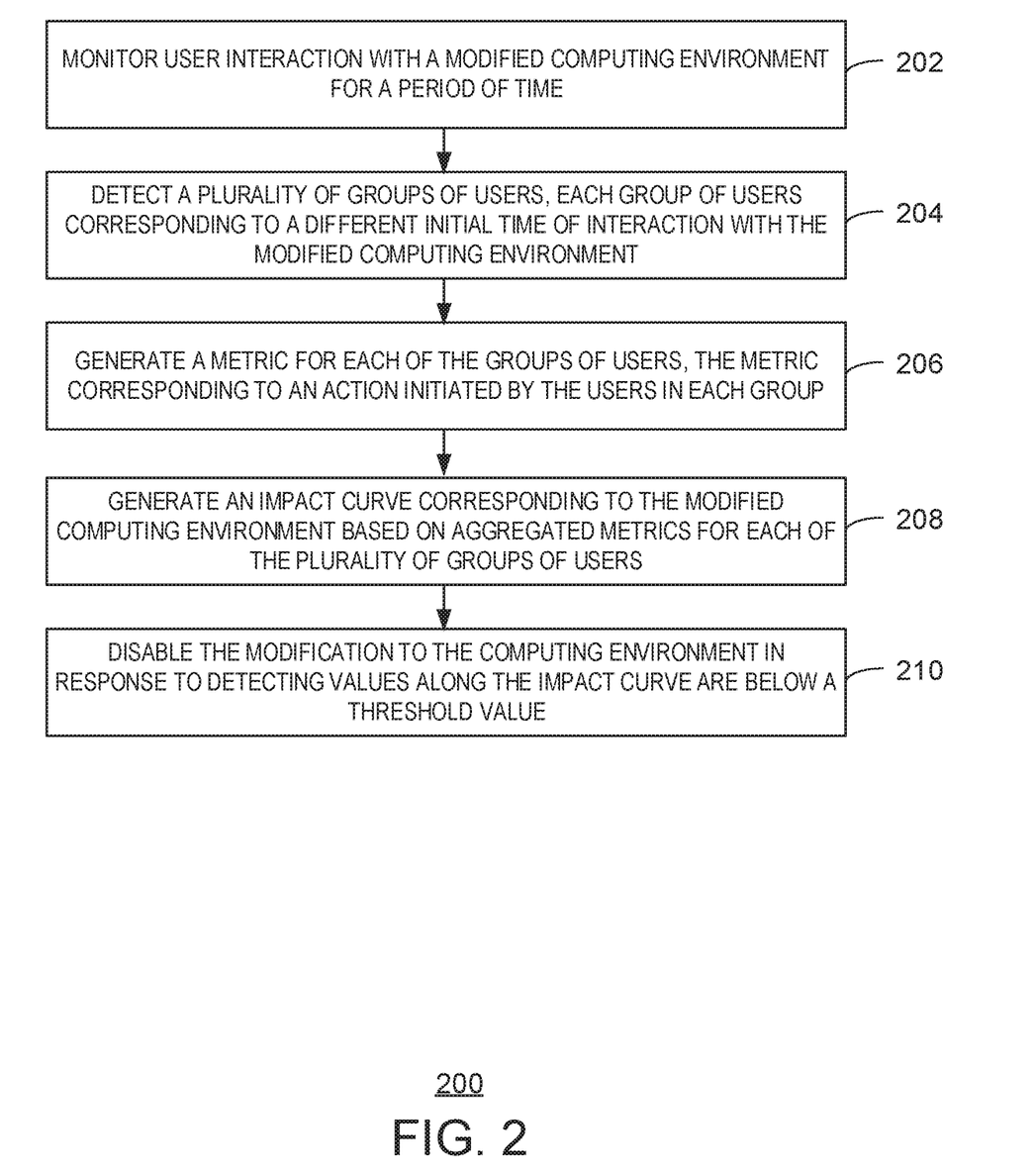
FIG. 2 is a process flow diagram of an example method for testing a computing environment.

FIG. 2 is a block diagram illustrating an example method that can test a computing environment. The method 200 can be implemented by any suitable computing device, such as the computing system 102 of FIG. 1.

At block 202, the monitor 142 can monitor user interaction with a modified computing environment for a period of time. A computing environment can include any suitable application or service, among others. For example, a computing environment can include a locally executed computer application, a website, a service available from a distributed server network, and the like. A modification can include any change to the computing environment such as a change to the appearance of the computing environment, a change to the functionality of the computing environment, and the like. As one example, a modification to the computing environment may include changing information displayed on a website, changing graphics on a website, changing a number of files that a user can upload, and the like. In some examples, the system can monitor user interaction with a modified computing environment for a period of time. In some embodiments, the period of time can correspond to a time frame for testing a modified computing environment.

In some embodiments, the modification to the computing environment can include a single change or a plurality of changes. For example, a single change to the computing environment can include modifying a number of files that a user is allowed to upload to the service, transmitting a message via a notification rather than by email, or changing one characteristic of an appearance of a website. In some examples, a plurality of changes to the computing environment can include modifying a number of files that a user is allowed to upload to the service, transmitting a message via a notification rather than by email, and changing one characteristic of an appearance of a website, or any combination thereof. In some embodiments, changes to the computing environment can also include advertisements that incorporate an upselling technique, and a duration associated with displaying the advertisement, among others. For example, the duration could be any suitable number of hours, days, and weeks, among others.

At block 204, the user cohort module 144 can detect a plurality of groups of users, wherein each group of users corresponds to a different initial time of interaction with the modified computing environment. For example, each group of users may begin interacting with the modified computing environment on a different date. Accordingly, the period of time each group of users interacts with the modified computing environment can vary. In some embodiments, the period of time for monitoring users shares a common expiration time or shared expiration time. Thus, a group of users may correspond to a shorter period of time for interacting with the modified computing environment than the additional groups of users. In some embodiments, the number of groups of users can be equal to the number of days during which the modified computing environment is tested. In some examples, the user cohort module 144 can divide users into groups based on any suitable time interval, such as a number of seconds, minutes, hours, days, weeks, months, or years. In some embodiments, each user group can correspond to a different number of time intervals during the period of time in which a computing environment is tested. For example, a first user group can correspond to all of the time intervals for monitoring a modified computing environment, a second user group can correspond to the number of time intervals minus one time interval, a third user group can correspond to the number of time intervals minus two time intervals, and so on.

At block 206, the metric generator 146 can generate a metric for each of the groups of users, wherein the metric corresponds to an action by the users in each group. As action, as discussed above, can include any suitable user input provided to the modified computing environment. For example, the action can include uploading files or content, entering text, selecting icons, and the like. In some examples, the actions can correspond to modified portions of the computing environment or unmodified portions of the computing environment. For example, the metric generator 146 may detect that users select an unmodified icon more frequently in a modified computing environment. In some embodiments, the metric for each group of users can correspond to an average number of times the users of a group perform the action. In other embodiments, the metric can correspond to any mathematical combination of the number of times the users of a group perform the action. For example, the metric generator 146 can determine a metric based on a weighted average of the frequency that users perform an action. In some examples, the weighted average can indicate that the metric generator 146 is to assign larger weight values to actions performed by some users. In some examples, the metric generator 148 can detect the metrics for the various groups of users using any suitable mathematical technique such as by calculating a standard average, a weighted average, a mean value, a mode value, a cubic mean, a generalized mean, a weighted mean, a truncated mean, or an interquartile mean, and the like. For example, the metric generator 146 can generate a cost function or cost curve based on attributes associated with groups of users. In some embodiments, the attributes can include a weighted revenue value generated per group based on products or services offered at different price points.

In some embodiments, the metric generator 148 can generate a demand bring forward measurement that indicates if a modified computing environment results in users performing an action sooner than users interacting with a controlled, unmodified computing environment. For example, the metric generator 148 can generate a demand bring forward measurement that indicates users are selecting an icon in a modified computing environment after two days of interaction with the modified computing environment. By contrast, the metric generator 148 can detect that users interacting with a controlled computing environment that does not include the modification may select the icon after one or two weeks. Accordingly, the demand bring forward measure can indicate if users interacting with the modified computing environment perform actions sooner than users interacting with an unmodified computing environment.

At block 208, the impact curve generator 148 can generate an impact curve corresponding to the modified computing environment based on aggregated metrics for each of the plurality of groups of users. In some embodiments, the impact curve indicates a change in the metrics corresponding to the groups of users. For example, the impact curve can indicate that the frequency with which users perform an action decreases or increases over time. Accordingly, the impact curve can indicate how users respond to the modified computing environment at various points in time during the testing of the modified computing environment. For example, the impact curve can indicate that the number of users that visit a modified website decreases or increases with time, the number of purchases from a website decreases or increases with time, and the like. For example, the impact curve generator 148 can generate a visualization of the aggregated metrics detected for each group of users during time intervals for an experiment.

At block 210, the environment modifier 150 can disable the modification to the computing environment in response to detecting values along the impact curve are below a threshold value. For example, the environment modifier 150 can determine that the modification to the computing environment is to be disabled and the original state of the computing environment is to be restored in response to detecting a number of values or a percentage of values along the impact curve are below a threshold value. The threshold value can indicate a frequency of user actions with the computing environment that represents an increase over the original state of the computing environment. For example, the threshold value can represent a number of selections of an icon on a website within a period of time, a number of website views, a number of content files uploaded to a website, and the like. In some embodiments, the environment modified 150 can determine that values along the impact curve are above a threshold value and indicate that the modification to the computing environment is to become permanent.

In one embodiment, the process flow diagram of FIG. 2 is intended to indicate that the steps of the method 200 are to be executed in a particular order. Alternatively, in other embodiments, the steps of the method 200 can be executed in any suitable order and any suitable number of the steps of the method 200 can be included. Further, any number of additional steps may be included within the method 200, depending on the specific application. For example, the environment modifier 150 can also detect that values along the impact curve remain above the threshold value and determine that the modification to the computing environment is to become permanent. Therefore, the environment modifier 150 can disregard the original state of the computing environment.

Figure 3:
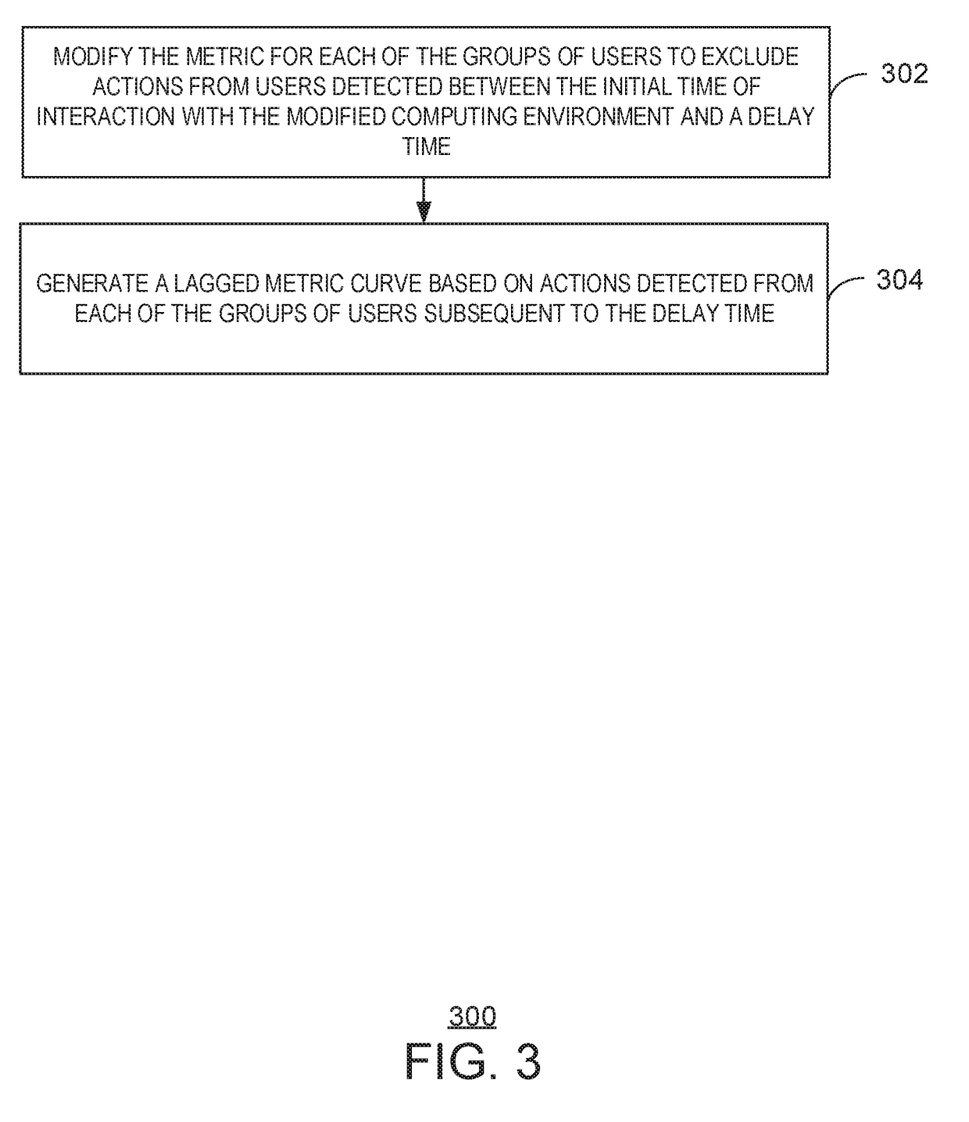
FIG. 3 is a process flow diagram of an example method for generating a lagged metric curve.

FIG. 3 is a process flow diagram illustrating a method for generating a lagged metric curve. The method 300 can be implemented with any suitable computing device, such as the computing system 102 of FIG. 1.

At block 302, a system can modify the metric for each of the groups of users to exclude actions from users detected between the initial time of interaction with the modified computing environment and a delay time. For example, the system can detect that actions by users are to be monitored after a delay period of time has elapsed. Accordingly, the system can detect a first interaction between the user and the modified computing environment. The system can also determine that actions performed between the initial interaction with the computing environment and the expiration of the delay are to be excluded from any analysis or generation of an impact curve. In some embodiments, the actions can include selections of a modified portion of the computing environment. For example, the actions can include selecting a modified portion of the computing environment to purchase a product, view content, upload content, and the like.

At block 304, a system can generate a lagged metric curve based on actions detected from each of the groups of users subsequent to the delay time. For example, the system can exclude actions performed by any number of groups of users between the user's initial interaction with the modified computing environment and the expiration of the delay period of time. The system can then generate a lagged metric curve reflecting a frequency of actions performed by the users between the expiration of the delay period of time and the end of the test for the modified computing environment. For example, the lagged metric curve can represent actions performed by users between week two and week four of the monitoring of a computing environment or any other suitable time range.

In one embodiment, the process flow diagram of FIG. 3 is intended to indicate that the steps of the method 300 are to be executed in a particular order. Alternatively, in other embodiments, the steps of the method 300 can be executed in any suitable order and any suitable number of the steps of the method 300 can be included. Further, any number of additional steps may be included within the method 300, depending on the specific application.

Figure 4:
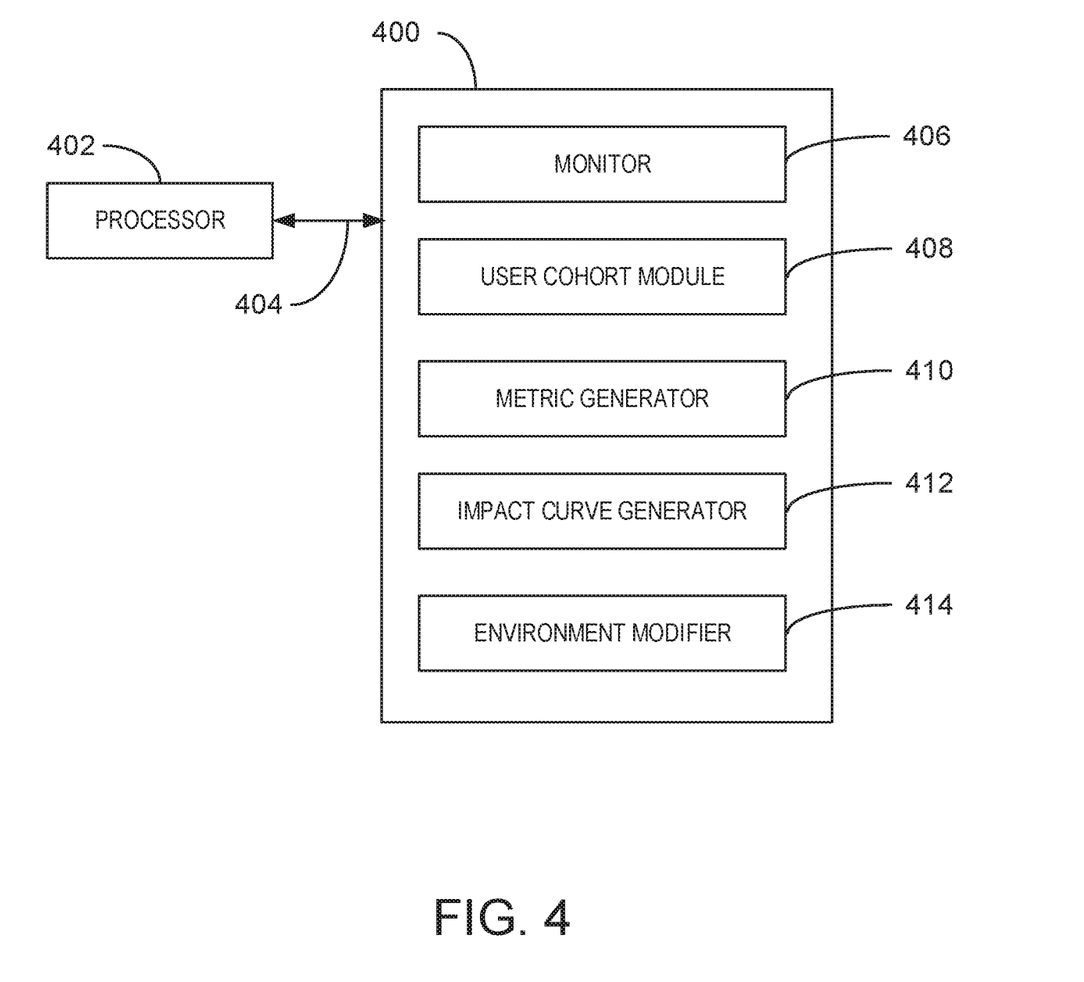
FIG. 4 is a block diagram of an example computer-readable storage media that can test a computing environment.

FIG. 4 is a block diagram of an example computer-readable storage media that can test a modified computing environment. The tangible, computer-readable storage media 400 may be accessed by a processor 402 over a computer bus 404. Furthermore, the tangible, computer-readable storage media 400 may include code to direct the processor 402 to perform the steps of the current method.

The various software components discussed herein may be stored on the tangible, computer-readable storage media 400, as indicated in FIG. 4. For example, the tangible computer-readable storage media 400 can include a monitor 406, a user cohort module 408, a metric generator 410, an impact curve generator 412, and an environment modifier 414, configured to enable testing a computing environment. In some embodiments, the monitor 406 can monitor user interaction with a modified computing environment for a period of time. For example, the monitor can detect user input received by the modified computing environment. In some embodiments, the user cohort module 408 can detect a plurality of groups of users, wherein each group of users corresponds to a different initial time of interaction with the modified computing environment. For example, a modified computing environment may be monitored for a period of time, such as a month, and the user cohort module 408 may separate groups of users based on the day in which the users interacted with the modified computing for the first time.

In some embodiments, the metric generator 410 can generate a metric for each of the groups of users, wherein the metric corresponds to an action in the modified computing environment initiated by the users in each group. In some embodiments, the impact curve generator 412 can generate an impact curve corresponding to the modified computing environment based on aggregated metrics for each of the plurality of groups of users. The impact curve can indicate whether users perform an action more frequently or less frequently after a period of time interacting with the modified computing environment. In some example, the impact curve generator 412 can generate the impact curve by aggregating or combining the metrics for each group of users. In some embodiments, the environment modifier 414 can determine based on the impact curve that actions performed by the users decreases below a threshold value over time. The environment modifier 414 can return the computing environment to an original state prior to the modification.

It is to be understood that any number of additional software components not shown in FIG. 4 may be included within the tangible, computer-readable storage media 400, depending on the specific application. Further, the monitor 406, user cohort module 408, metric generator 410, impact curve generator 412, and environment modifier 414 can be implemented by the processor 402 residing in a server of a distributed network. Accordingly, a remote computing device may request data from the processor 402 and the monitor 406, user cohort module 408, metric generator 410, impact curve generator 412, and environment modifier 414 can detect how users accessing the remote computing device interact with the requested data.

Figure 5:
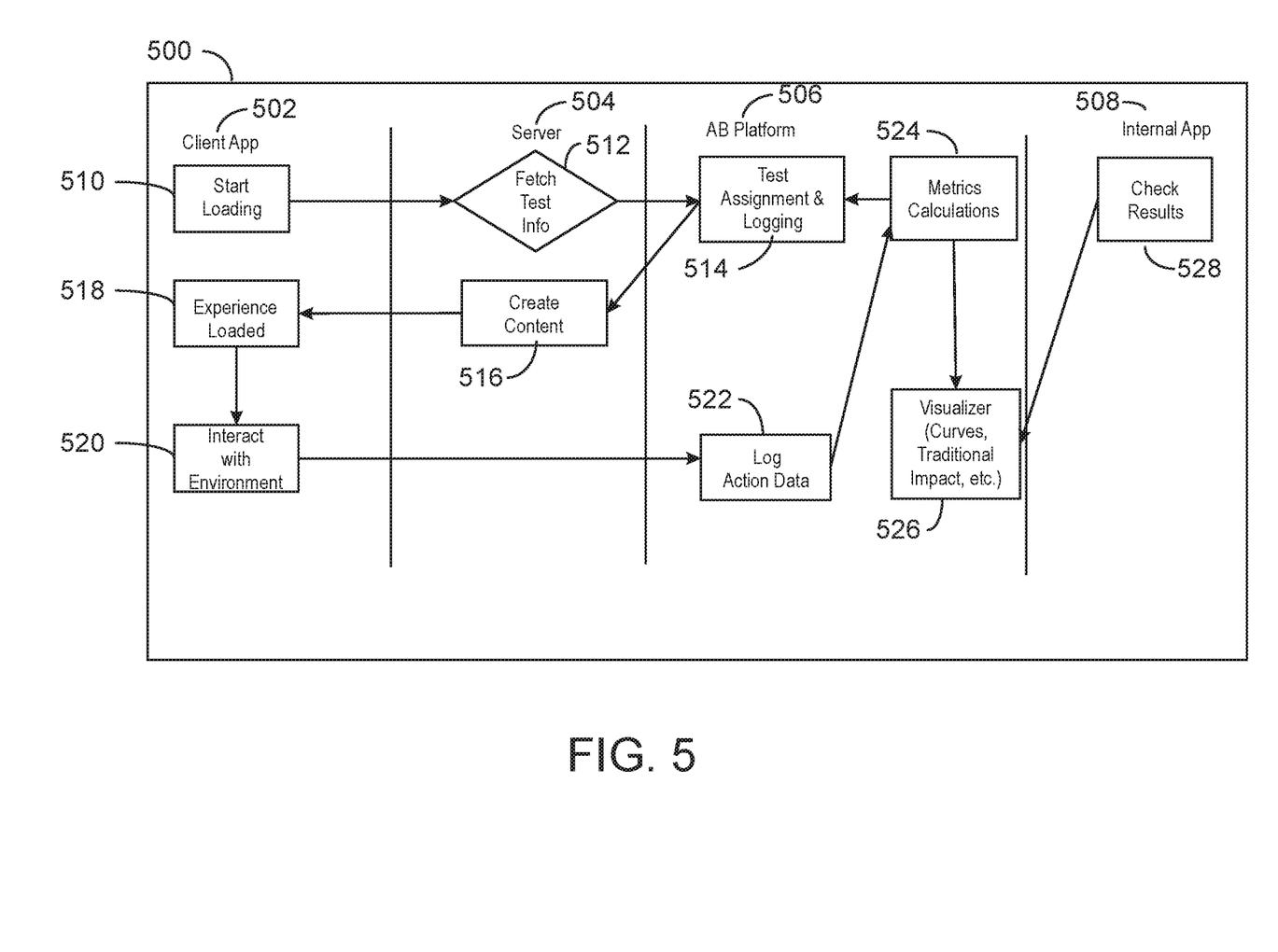
FIG. 5 is a block diagram of an example environment for testing a computing environment.

FIG. 5 is a block diagram illustrating an example environment for testing a computing environment. In some embodiments, the test environment 500 can include a client application 502, a server 504, an AB platform 506, and an internal application 508. In some examples, the client application 502 can start loading a computing environment at block 510. For example, a client application 502 can initiate a request to begin loading a webpage, a service, and the like. In some embodiments, the server 504 detects the request to load a computing environment and fetches test information at block 512. The test information can include one or more modifications to be applied to the computing environment during a test. For example, the test information can indicate an icon is to be modified on a webpage, or a user interface for a service is to be modified, among others. At block 514, the AB platform 506 can detect a request to fetch test information by the server 504 and the AB platform 506 can assign a test and logging information to the computing environment requested by the client application 502. For example, the test can assign a modification to be applied to the computing environment and the logging information can indicate a time period or duration of time during which the modification is to be applied to the computing environment. In some examples, the logging information can also indicate time intervals within the time period to collect data from users interacting with the modified computing environment. For example, the logging information can indicate to collect and aggregate user data for each day the users interact with a modified computing environment.

In some embodiments, the AB platform 506 transmits the test assignment to the server 504 to enable the server 504 to create content at block 516. For example, the server 504 can create user interfaces based on the modification specified in the test assignment. In some examples, the created user interfaces can include new icons, new text, reorganized content, and the like. The server 504 can send the created content to the client application 502, which enables the client application 502 to load an experience at block 518. The loaded experience can include the modified computing environment based on the created content. At block 520, the client application 502 can enable interaction with the modified computing environment. For example, the client application 502 can enable any number of users to interact with the modified computing environment and perform actions using the modified computing environment.

In some embodiments, the client application 502 can send action data to the AB platform 506, wherein the action data indicates actions performed by users using the modified computing environment. For example, the action data can indicate a number of times users select icons, upload files, and the like. The AB platform 506 can log the action data at block 522 and use the logged action data to calculate metrics at block 524. The metrics, as discussed above, can indicate a frequency with which users perform actions during each time interval for the test time period corresponding to the modified computing environment. In some embodiments, the AB platform 506 can also generate an impact curve based on the metrics at block 526. The impact curve can aggregate the metric data for any number of time intervals during the test time period for the modified computing environment and provide a visualization of a frequency that users perform actions during any particular time interval. In some embodiments, at block 528, an internal application 508 can check the results by requesting the impact curve from the AB platform 506 or requesting the metrics from the AB platform 506.

Example 1

An embodiment described herein includes a system for testing a computing environment comprising a processor that can monitor user interaction with a modified computing environment for a period of time. The processor can also detect a plurality of groups of users, wherein each group of users corresponds to a different initial time of interaction with the modified computing environment. The processor can also generate a metric for each of the groups of users, the metric corresponding to an action in the modified computing environment initiated by the users in each group. Furthermore, the processor can generate an impact curve corresponding to the modified computing environment based on aggregated metrics for each of the plurality of groups of users and disable the modification to the computing environment in response to detecting values along the impact curve are below a threshold value.

Alternatively, or in addition, the processor can monitor each group of users until a shared expiration time is reached. Alternatively, or in addition, the computing environment can include an application or a service. Alternatively, or in addition, the modification to the computing environment can include a single change to the application or the service. Alternatively, or in addition, the single change can include modifying a number of files that a user is allowed to upload to the service, transmitting a message via a notification rather than by email, or changing one characteristic of an appearance of a website. Alternatively, or in addition, the modification to the computing environment can include a plurality of changes to the application or the service. Alternatively, or in addition, the plurality of changes can include modifying a number of files that a user is allowed to upload to the service, transmitting a message via a notification rather than by email, and changing one characteristic of an appearance of a website, or any combination thereof. Alternatively, or in addition, the impact curve can indicate a change in the metrics corresponding to the groups of users. Alternatively, or in addition, the processor can modify the metric for each of the groups of users to exclude actions from users detected between the initial time of interaction with the modified computing environment and a delay time and generate a lagged metric curve based on actions detected from each of the groups of users subsequent to the delay time. Alternatively, or in addition, the actions can include selections of a modified portion of the computing environment.

Example 2

Another embodiment described herein includes a method for testing a computing environment that includes monitoring, via a processor, user interaction with a modified computing environment for a period of time. The method can also include detecting, via the processor, a plurality of groups of users, wherein each group of users corresponds to a different initial time of interaction with the modified computing environment. Additionally, the method can include generating, via the processor, a metric for each of the groups of users, the metric corresponding to an action in the modified computing environment initiated by the users in each group. Furthermore, the metric can include generating, via the processor, an impact curve corresponding to the modified computing environment based on aggregated metrics for each of the plurality of groups of users and disabling, via the processor, the modification to the computing environment in response to detecting values along the impact curve are below a threshold value.

Alternatively, or in addition, the method can include monitoring each group of users until a shared expiration time is reached. Alternatively, or in addition, the computing environment can include an application or a service. Alternatively, or in addition, the modification to the computing environment can include a single change to the application or the service. Alternatively, or in addition, the single change can include modifying a number of files that a user is allowed to upload to the service, transmitting a message via a notification rather than by email, or changing one characteristic of an appearance of a website. Alternatively, or in addition, the modification to the computing environment can include a plurality of changes to the application or the service. Alternatively, or in addition, the plurality of changes can include modifying a number of files that a user is allowed to upload to the service, transmitting a message via a notification rather than by email, and changing one characteristic of an appearance of a website, or any combination thereof. Alternatively, or in addition, the impact curve can indicate a change in the metrics corresponding to the groups of users. Alternatively, or in addition, the method can include modifying the metric for each of the groups of users to exclude actions from users detected between the initial time of interaction with the modified computing environment and a delay time and generate a lagged metric curve based on actions detected from each of the groups of users subsequent to the delay time. Alternatively, or in addition, the actions can include selections of a modified portion of the computing environment.

Example 3

In yet another embodiment described herein, one or more computer-readable storage devices for testing a computing environment can include a plurality of instructions that, based at least on execution by a processor, cause the processor to monitor user interaction with a modified computing environment for a period of time. The plurality of instructions can also cause the processor to detect a plurality of groups of users, wherein each group of users corresponds to a different initial time of interaction with the modified computing environment. Additionally, the plurality of instructions can cause the processor to generate a metric for each of the groups of users, the metric corresponding to an action in the modified computing environment initiated by the users in each group. Furthermore, the plurality of instructions can cause the processor to generate an impact curve corresponding to the modified computing environment based on aggregated metrics for each of the plurality of groups of users and disable the modification to the computing environment in response to detecting values along the impact curve are below a threshold value.

Alternatively, or in addition, the plurality of instructions can cause the processor to monitor each group of users until a shared expiration time is reached. Alternatively, or in addition, the computing environment can include an application or a service. Alternatively, or in addition, the modification to the computing environment can include a single change to the application or the service. Alternatively, or in addition, the single change can include modifying a number of files that a user is allowed to upload to the service, transmitting a message via a notification rather than by email, or changing one characteristic of an appearance of a website. Alternatively, or in addition, the modification to the computing environment can include a plurality of changes to the application or the service. Alternatively, or in addition, the plurality of changes can include modifying a number of files that a user is allowed to upload to the service, transmitting a message via a notification rather than by email, and changing one characteristic of an appearance of a website, or any combination thereof. Alternatively, or in addition, the impact curve can indicate a change in the metrics corresponding to the groups of users. Alternatively, or in addition, the plurality of instructions can cause the processor to modify the metric for each of the groups of users to exclude actions from users detected between the initial time of interaction with the modified computing environment and a delay time and generate a lagged metric curve based on actions detected from each of the groups of users subsequent to the delay time. Alternatively, or in addition, the actions can include selections of a modified portion of the computing environment. Alternatively, or in addition, the plurality of instructions, based at least on execution by the processor, can cause the processor to generate a demand bring forward measurement indicating that the modified computing environment results in at least one of the groups of users performing the action sooner than a group of users interacting with an unmodified computing environment.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for testing a computing environment, comprising:
a processor to:
monitor user interaction with a modified computing environment for a period of time;
detect a plurality of groups of users, each group of users corresponding to a different initial time of interaction with the modified computing environment, wherein the modified computing environment comprises enabling each of the groups of users to upload a different number of files;
generate an impact curve corresponding to the modified computing environment based on aggregated metrics for each of the plurality of groups of users;
generate a demand bring forward measurement value indicating that the modified computing environment results in at least one of the groups of users performing the interaction sooner than a group of users interacting with an unmodified computing environment; and
disable the modification to the computing environment in response to detecting values along the impact curve are below a threshold value and in response to detecting that the demand bring forward measurement value indicates that an unmodified computing environment receives an initial user interaction prior to the modified computing environment.

2. The system of claim 1, wherein the processor is to monitor each group of users until a shared expiration time is reached.

3. The system of claim 1, the computing environment comprising an application or a service.

4. The system of claim 3, the modification to the computing environment comprising a change to the application or the service.

5. The system of claim 4, wherein the change comprises changing one characteristic of an appearance of a website.

6. The system of claim 1, the modification to the computing environment comprising a plurality of changes to the application or the service.

7. The system of claim 1, wherein the impact curve indicates a change in the metrics corresponding to the groups of users.

8. The system of claim 1, wherein the processor is to:
modify the metrics for each of the groups of users to exclude actions from users detected between the initial time of interaction with the modified computing environment and a delay time; and
generate a lagged metric curve based on actions detected from each of the groups of users subsequent to the delay time.

9. The system of claim 8, the actions comprising selections of a modified portion of the computing environment.

10. A method for testing a computing environment, comprising:
monitoring, via a processor, user interaction with a modified computing environment for a period of time;
detecting, via the processor, a plurality of groups of users, each group of users corresponding to a different initial time of interaction with the modified computing environment, wherein the modified computing environment comprises enabling each of the groups of users to upload a different number of files;
generating, via the processor, an impact curve corresponding to the modified computing environment based on aggregated metrics for each of the plurality of groups of users;
generating a demand bring forward measurement value indicating that the modified computing environment results in at least one of the groups of users performing the interaction sooner than a group of users interacting with an unmodified computing environment; and
disabling, via the processor, the modification to the computing environment in response to detecting values along the impact curve are below a threshold value and in response to detecting that the demand bring forward measurement value indicates that an unmodified computing environment receives an initial user interaction prior to the modified computing environment.

11. The method of claim 10, comprising monitoring each group of users until a shared expiration time is reached.

12. The method of claim 10, the computing environment comprising an application or a service.

13. The method of claim 12, the modification to the computing environment comprising a change to the application or the service.

14. The method of claim 13, wherein the change comprises changing one characteristic of an appearance of a website.

15. The method of claim 10 comprising:
modifying the metrics for each of the groups of users to exclude actions from users detected between the initial time of interaction with the modified computing environment and a delay time; and
generating a lagged metric curve based on actions detected from each of the groups of users subsequent to the delay time.

16. The method of claim 15, the actions comprising selections of a modified portion of the computing environment.

17. One or more computer-readable storage media devices for testing a computing environment comprising a plurality of instructions that, based at least on execution by a processor, cause the processor to:
monitor user interaction with a modified computing environment for a period of time;
detect a plurality of groups of users, each group of users corresponding to a different initial time of interaction with the modified computing environment, wherein the modified computing environment comprises enabling each of the groups of users to upload a different number of files;
generate an impact curve corresponding to the modified computing environment based on aggregated metrics for each of the plurality of groups of users;
generate a demand bring forward measurement value indicating that the modified computing environment results in at least one of the groups of users performing the interaction sooner than a group of users interacting with an unmodified computing environment; and
disable the modification to the computing environment in response to detecting values along the impact curve are below a threshold value and in response to detecting that the demand bring forward measurement value indicates that an unmodified computing environment receives an initial user interaction prior to the modified computing environment.

18. The one or more computer-readable storage media devices of claim 17, wherein the plurality of instructions, based at least on execution by the processor, cause the processor to:
modify the metrics for each of the groups of users to exclude actions from users detected between the initial time of interaction with the modified computing environment and a delay time; and generate a lagged metric curve based on actions detected from each of the groups of users subsequent to the delay time.

* * * * *